Sept. 29, 1959   W. W. HANSEN   2,906,883
POSITION INDICATOR
Filed Aug. 14, 1953   2 Sheets-Sheet 1
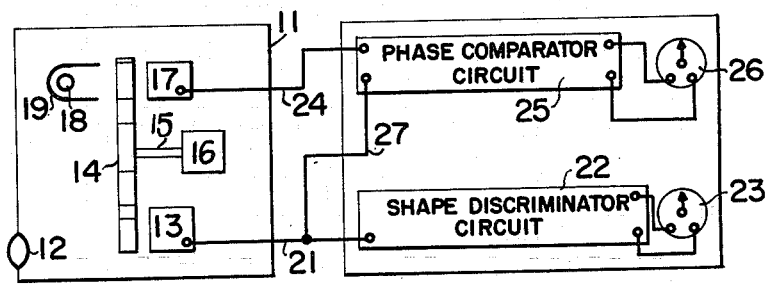
FIG. 1
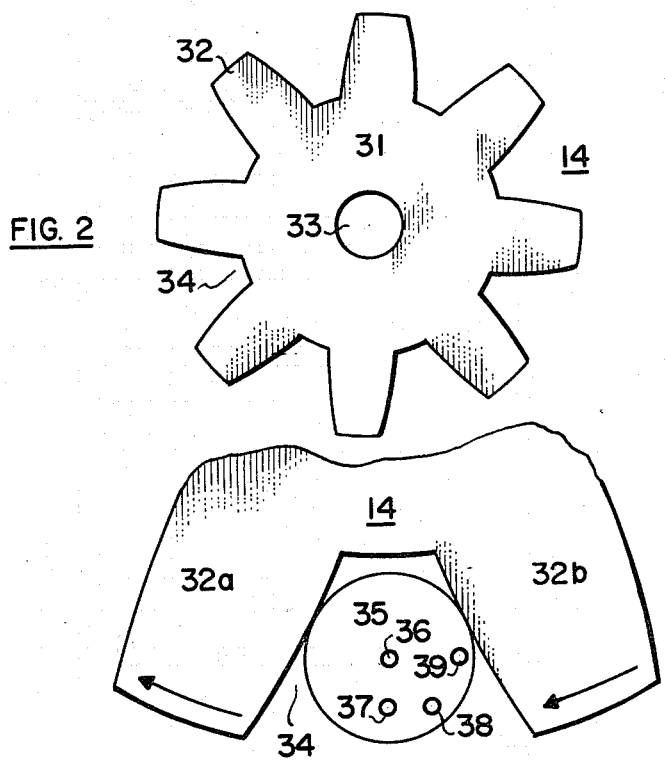
FIG. 2
FIG. 3
INVENTOR
WILBUR W. HANSEN
By George Lipkin
H. H. Heintzen
ATTORNEYS Sept. 29, 1959 W. W. HANSEN 2,906,883
POSITION INDICATOR
Filed Aug. 14, 1953 2 Sheets-Sheet 2

INVENTOR
WILBUR W. HANSEN
BY George Sipkin
ATTORNEYS

2,906,883

POSITION INDICATOR

Wilbur W. Hansen, Evergreen Park, Ill., assignor, by mesne assignments, to the United States of America as represented by the Secretary of the Navy Application August 14, 1953, Serial No. 374,453

4 Claims. (Cl. 250—203)

This invention relates to indicators for sensing the position of an object and more particularly to a position indicator which is actuated by radiations from said object.

It is an object of this invention to provide a new and improved position indicator.

Another object of this invention is to provide a new indicator for sensing the position of an object which indicator is actuated by radiations from the object.

It is a further object of this invention to provide a new position indicator which utilizes a single chopping disk to enable the apparatus to sense the position of an object in both azimuth and elevation.

Other objects and advantages of the invention will hereinafter become more fully apparent from the following description of the annexed drawings, which illustrate a preferred embodiment, and wherein:

Fig. 1 is a diagrammatic drawing of the position indicator of this invention;

Fig. 2 is a view of a face of the chopping disk of this invention;

Fig. 3 is a diagrammatic drawing of two of the interceptors of the chopping disk, of the space between them and of the sensitized radiation reception area;

Figure 4:
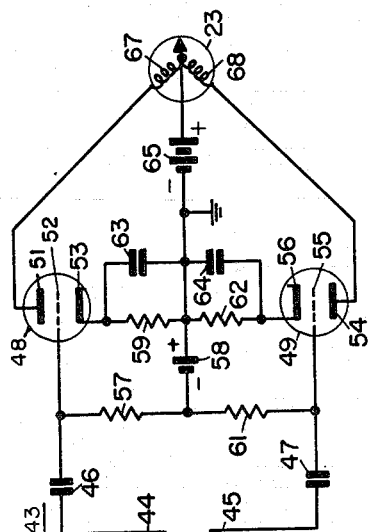
Fig. 4 is a schematic drawing of a shape discriminator circuit for use with this invention.

Referring now to Fig. 1, the reference numeral 11 designates a housing containing a photo-cell 13 and having a lens 12 mounted in a wall of the housing. The lens 12 focuses the radiations of the object (not shown) the position of which is to be sensed on a portion of the sensitive surface of the photo-cell 13. These radiations may be visible light, ultra-violet or infrared radiations. Interposed between the lens 12 and the photo-cell 13 is a chopping disk 14 which is mounted on a shaft 15 rotated by a motor 16. The chopping disk 14 (see Fig. 2) comprises a generally disk-like portion 31 having a plurality of teeth or interceptors 32 spaced about its circumference to intermittently intercept the radiations from the object as the disk revolves. A center hole 33 is provided for mounting the disk 14 upon the shaft 15. The interceptors 32 are tapered becoming progressively narrower toward the end which is remote from the center of the disk 14. Between the interceptors 32 are spaces 34 which are tapered in a direction opposite to the direction of taper of the interceptors 32. It will be apparent that as the chopping disk 14 rotates at any given rotational speed, the time during which an interceptor or a space remains over a given point depends upon the distance of the given point from the center of the disk 14. The output from the photo-cell 13 thus is a series of pulses the width of which depends upon the radial distance from the center of the disk 14 of the focused radiations from the object whose position is to be indicated.

Figures 4A, 4B:
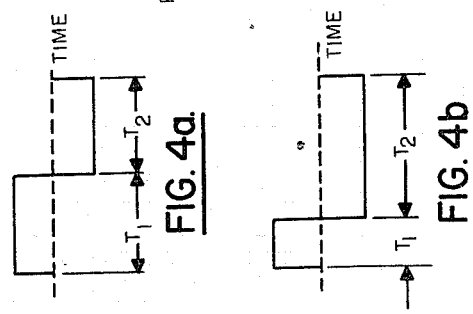
Figs. 4a and 4b are graphic representations of the signal input to the shape discriminator circuit of Fig. 4.

This is illustrated in Fig. 3 which shows two adjacent interceptors 32a and 32b assumed to rotate in a clockwise direction and having a space 34 between them. Within the space 34 is the sensitized image area 35 of the object photo-cell 13 which lies behind the chopping disk 14. For this explanation, three possible image positions have been indicated at 36, 37, and 38. The image position 36 in the center of the image area 35 is assumed to be the reference position from which a deviation is to be indicated. As the image of the object moves from the position 36 to the position 37 and as the interceptors 32a and 32b move over the image area 35, the period of time that the image impinges upon the image area 35 increases while the period of time during which the radiation is interrupted by the interceptors 32a and 32b decreases. The resulting electrical output from the photo-cell 13 changes from a series of pulses and intervals of equal width to a series of pulses which are of a width greater than the intervals between them. A line 21 couples the output from the object photo-cell 13 into a shape discriminator circuit 22 whose output is indicated by a meter 23. The shape discriminator circuit 22 for analyzing the shape of the pulses from the object photo-cell 13 is illustrated in Fig. 4. The output of the object photo-cell 13 is amplified and clipped by an amplifier and clipper circuit 41 to approach more closely the ideal of a rectangular wave of constant amplitude. The signal is then fed into a phase inverter 42 and thence to a shape discriminator which is designated generally by the reference numeral 43. From the phase inverter, the signal is conducted by lines 44 and 45 to capacitors 46 and 47 which are in the input circuits to triodes 48 and 49. The triode 48 comprises an anode 51, a control grid 52 and a cathode 53; and the triode 49 comprises an anode 54, a control grid 55 and a cathode 56. The capacitor 46 is connected to the control grid 52 of the triode 48, and a grid return resistor 57 connects the control grid 52 to the cathode 53 through a source of grid bias 58 and a cathode resistor 59. The capacitor 47 is connected to the control grid 55 of the triode 49, and a grid return resistor 61 connects the control grid 55 to the cathode 56 through the source of grid bias 58 and a cathode resistor 62. By-pass capacitors 63 and 64 are connected across the cathode resistors 59 and 62 respectively. Power is supplied to the anodes 51 and 54 from a source of high voltage 65. Interposed between the source of high voltage 65 and the anodes 51 and 54 is a differential galvanometer 23 which comprises two separate field windings 67 and 68. The field winding 67 is connected in series with the anode 51 and the field winding 68 is in series with the anode 54. The triodes 48 and 49 are biased beyond cut-off and neither tube will conduct until a positive signal is applied to its control grid. The signal output from the amplifier and clipper circuit 41 is a series of substantially rectangular pulses of an amplitude which is sufficient to overcome the bias applied to the control grids 52 and 55. The phase inverter 42 provides an output of two separate signal trains which are similar except for the fact that they are 180 degrees out of phase. During positive half-cycles of the original signal, the bias voltage on the control grid 52 will be overcome and the triode 48 will conduct. During the negative half-cycle of the original signal, a positive voltage will be applied to the control grid 55 to cause the triode 49 to conduct. During the conduction by one tube the other tube is cut-off since the signal voltage applied to its grid is negative. The output currents of the triode 48 traverse one coil 67 of the instrument 23 and tend to deflect the instrument pointer in one direction while the output currents of the triode 49 traverse the other coil 68 of the instrument 23 and tend to deflect the instrument pointer in the opposite direction. The result is an algebraic summation of the integrals of the output currents of the triodes 48 and 49 which is indicated by the meter 23. When a signal of the waveform of Fig. 4a is applied to the shape discriminator of Fig. 4 the indication of the meter 23 is zero since the outputs of the triodes 48 and 49 are equal. However, when a signal of the waveform of Fig. 4b is applied to the shape discriminator of Fig. 4, the meter 23 indicates a value other than zero since one of the triodes conducts for a longer interval than the other. The meter indication would be proportional to the time difference $t_1 - t_2$ (see Fig. 4a) and would be proportional to a radial deviation of the image of the object from the central position 36 which deviation is one component of the bearing of the object from the sensitized portion of the photo-cell 13.

The apparatus for determining the component of circumferential deviation of the image of the object from the central position 36 will now be described. Referring again to Fig. 1, the reference numeral 17 designates a second, or reference, photo-cell which is contained in the housing 11 and which is energized from a fixed source of radiation such as a lamp 18. A reflector 19 directs the radiation from the source 18 toward the chopping disk 14 and the photo-cell 17. The output of the reference photo-cell 17 is an electrical signal which consists of a series of uniform pulses which are fed into a phase comparator circuit 25 by a line 24. In Fig. 3, the image of the reference source of radiations 18 is shown for illustration purposes in position 39. As the object image moves from the position 37 to the position 38, the interval between the time when the leading edge of the interceptors 32b interrupts the reference image 39 and the time when it interrupts the object image decreases. In other words, the phase angle between the output signal of the target photo-cell 13 and the output signal of the reference photo-cell 17 decreases as the object moves from position 37 to position 38. The outputs from the photo-cells 13 and 17 are fed into a phase comparator circuit 25 by lines 24 and 27.

Figure 5A:
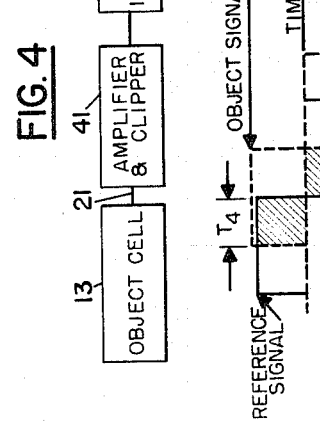
Fig. 5a is a graphic representation of the input signals to the phase comparator circuit of Fig. 5.
Figure 5:
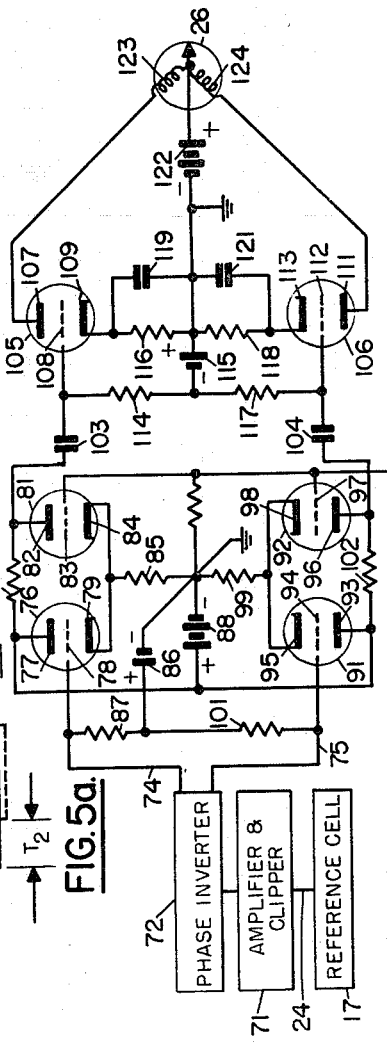
Fig 5 is a schematic drawing of a phase comparator circuit for use with this invention.

A phase comparator circuit 25 for comparing the phase angle of the output of the object photo-cell 13 with the output of the reference photo-cell 17 is shown in Fig. 5. The signal output from the reference photo-cell 17 is amplified and clipped by an amplifier and clipper circuit 71 and is then fed into a phase inverter 72 to produce two signals which are 180 degrees out of phase. These two signals are conducted by lines 74 and 75 into a phase comparator 73. Line 74 is connected to the control grid 78 of a triode 76. The cathode 79 of the triode 76 is directly connected to the cathode 84 of the triode 81 and the two cathodes are connected to ground by a cathode resistor 85. The control grid 78 of the triode 76 is biased positively by a battery 86 through a grid resistor 87 so that its cathode current, flowing through the cathode resistor 85, produces a voltage drop sufficient to bias the triode 81 beyond the cutoff. Energy is supplied to the anodes 77 and 82 from a source of high voltage 88. A resistor 89 is provided to reduce the voltage applied to the anode 82 to a value less than that applied to the anode 77. The second channel comprises triodes 91 and 92. The cathodes 95 and 98 of the triodes 91 and 92 are connected together and to ground through a resistor 99. Signals from the phase inverter 72 are fed into the control grid 94 by means of the line 75, and a bias voltage is supplied to the tube 91 by the battery 86 through a grid resistor 101. Energy is supplied to the anode 93 directly and to the anode 96 through a resistor 102 by the high voltage source 88. The control grids 83 and 97 of the triodes 81 and 92 are connected together and are both supplied with the same signals from the object cell phase inverter 42. The anodes 82 and 96 are connected to capacitors 103 and 104 which are in the input circuits to triodes 105 and 106. The triode 105 comprises an anode 107, a control grid 108 and a cathode 109; and the triode 106 comprises an anode 111, a control grid 112 and a cathode 113. The capacitor 103 is connected to the control grid 108 of the triode 105, and a grid return resistor 114 connects the control grid 108 to the cathode 109 through a source of grid bias 115 and a cathode resistor 116. The capacitor 104 is connected to the control grid 112 of the triode 106, and a grid return resistor 117 connects the control grid 112 to the cathode 113 through a source of grid bias 115 and a cathode resistor 118. By-pass capacitors 119 and 121 are connected across the cathode resistors 116 and 118 respectively. Power is supplied to the anodes 107 and 111 from a source of high voltage 122. Interposed between the source of high voltage 122 and the anodes 107 and 111 is a differential galvanometer 26 which comprises two separate field windings 123 and 124. The field winding 123 is connected in series with the anode 107 and the field winding 124 is connected in series with the anode 111. The triodes 105 and 106 are biased beyond cut-off and neither tube will conduct until a positive signal is applied to its control grid.

Fig. 5a shows a reference signal pulse by a solid line and an object signal pulse by a dashed line. When positive reference signals from the phase inverter 72 are applied to the control grids 78 and 94, the tubes 76 and 91 allow sufficient current to flow through the cathode resistors 85 and 99 to bias the triodes 81 and 92 beyond cut-off. A positive object signal from the object cell phase inverter 72 does not overcome the bias and therefore does not allow the tubes 81 and 92 to conduct. However, when negative reference signals are applied to the control grids 78 and 94, the bias is changed and the current flow through the triodes 76 and 91 decreases, lowering the negative bias voltage applied to the triodes 81 and 92. A positive object signal applied to the control grids 83 and 97 would then overcome the negative bias and allow the triodes 81 and 92 to conduct. Since the signals applied to control grids 78 and 94 are 180 degrees out of phase, when the signal on one grid is positive, the signal on the other grid is negative. It will be apparent from Fig. 5a, that, since there will be an output from tubes 81 and 92 only when the reference signal is negative and the object signal is positive, the triode 81 will conduct only during the period identified as $t_2$ and the triode 92 will conduct only during the period $t_4$. When the phase of the reference and object signal differ by 90 degrees, $t_2$ is equal to $t_4$ and the indication of meter 26 is zero. When the phase difference varies from 90 degrees, $t_2$ differs from $t_4$ and the meter 26 indicates a value other than zero. The indication of meter 26 would be proportional to the time difference $t_4 - t_2$ (see Fig. 5a) and would be proportional to the extent of the deviation of the image of the object from the central position 36 in a direction which is parallel to the direction of the movement of the interceptors. This indication is relatively insensitive to the sum $t_2$ and $t_4$ and is proportional to another component of the bearing of the object from the sensitized portion of the photo-cell 13.

The output of the shape discriminator circuit 22 and the output of the phase comparator circuit 25 produce indications on the meters 23 and 26 respectively which indications are proportional to mutually perpendicular components of the bearing of the object whose position is to be indicated. The indications of the meters 23 and 26 together indicate the position of the object with respect to the sensitized portion of the photo-cell 13.

Although the invention has been described in connection with apparatus the output of which activates measuring instruments, it is also contemplated that the outputs of the shape discriminator 43 and the phase comparator 73 may be utilized to operate positioning means.

The sensing units contained in the housing 11 may be moved in response to the object signals to track a moving object by utilizing the energy supplied to the instruments 23 and 26. Reflecting focusing means such as a parabolic mirror may be substituted for the lens 12 and may be moved to follow the movement of a moving target, or the entire housing 11 and its contents may be moveably mounted to track. In addition, the disclosed apparatus may be used to activate auxiliary apparatus such as guns, searchlights or missiles.

The interceptors 32 have been described as mounted upon the periphery of a disk 14. Because the motion of the interceptors 32 is circular, the leading and trailing edges of the interceptors 32 should define portions of a spiral to give a signal wave shape variation which is proportional to the motion of the object image along a radius. The interceptors may take forms other than that described above. For example, the interceptors may comprise opaque portions of a transparent strip which has a linear motion. In that case, the leading and trailing edges of the interceptors should be straight. Further, the interceptors may comprise spokes of a wheel, and they may lie in different planes. Many variations of the interceptors are possible within the scope of the invention.

The described position indicator is simpler and more positive in its operation than prior art devices because a single series of the interceptors produces signals which can be detected to indicate both elevation and azimuth.

Obviously many modifications and variations of the present invention are possible in the light of the above teachings. It is therefore to be understood that within the scope of the appended claims the invention may be practiced otherwise than as specifically described.

What is claimed is:

1. A device for sensing the position of an image focused on a portion of the sensitive surface of a photo-cell with respect to said surface, said image comprising radiations from an object, said photo-cell emitting a signal in response to said image, said device comprising a series of spaced interceptors, means for moving said interceptors in a first direction in regular sequence over said surface to periodically interrupt said radiations whereby said signal is transformed into a pulsating signal including intervals, said interceptors being tapered in a second direction to provide wide and narrow portions, said second direction being approximately at right angles to said first direction and to the direction of the radiations focused on said surface, whereby a location of said image on said surface when adjacent said wide portions produces a signal in which the width of the pulse is shorter and the width of the interval between pulses is greater than when the location of said image on said surface is adjacent said narrow portions, and means responsive to said pulse widths for indicating the position of said image on said surface in a direction at right angles to the direction of the motion of said interceptors.

2. A device for sensing the position of an image focused on a portion of the sensitive surface of a photo-cell with respect to said surface, said image comprising radiations from an object, said photo-cell emitting a signal in response to said image, said device comprising a series of spaced interceptors, means for moving said interceptors in a first direction in regular sequence over said surface to periodically interrupt said radiations whereby said signal is transformed into a pulsating signal including intervals, said interceptors being tapered in a second direction to provide wide and narrow portions, said second direction being approximately at right angles to said first direction and to the direction of the radiations focused on said surface, whereby a location of said image on said surface when adjacent said wide portions produces a signal in which the width of the pulse is shorter and the width of the interval between pulses is greater than when the location of said image on said surface is adjacent said narrow portions, means responsive to said pulse widths for indicating the position of said image on said surface in a direction at right angles to the direction of motion of said interceptors, means for emitting reference pulses of a frequency equal to the frequencies of the pulses emitted by said cell, said reference pulses being at a predetermined phase angle with the pulses emitted by said cell when said image is at a predetermined position on said sensitive surface, and means responsive to the phase difference between the reference pulses and the pulses emitted by said cell for determining the displacement of said image from said predetermined position in the direction of motion of said interceptors.

3. Apparatus for sensing the rectangular coordinates representing the altitude and azimuth in a finite reference plane of a light beam of elemental area, means for cyclically intercepting all elemental light paths through said plane in such manner that the ratio between the time intervals a light path is intercepted and not intercepted is unique for each group of paths having the same altitude, ratio sensing means including light sensitive means responsive to light passing through said plane for deriving a signal corresponding to the altitude of the light beam, means for producing a reference signal having a fixed phase relation with said intercepting means, and means responsive to the phase relation between the reference signal and the signal from the light sensitive means for indicating the azimuth of the light beam.

4. A device for sensing the position of a radiation image with respect to a reference line comprising in combination means for interrupting at a substantially regular rate the image bearing radiation, said interrupting means consisting of a plurality of equally spaced interceptors movable in the direction generally parallel to the reference line, said interceptors being so shaped that their widths vary as a function of their algebraic distance from the reference line when they are in radiation interrupting position, whereby the ratio between the time intervals the image bearing radiation is interrupted and not interrupted varies as a function of changes in the position of the radiation image with respect to the reference line, and a ratio sensitive device actuated by the image bearing radiation passed by said interrupting means.

References Cited in the file of this patent

UNITED STATES PATENTS

| 2,222,429 | Briebrecher | Nov. 19, 1940 |
| 2,513,367 | Scott | July 4, 1950 |